(12) United States Patent
Kim

(10) Patent No.: US 10,798,264 B2
(45) Date of Patent: Oct. 6, 2020

(54) IMAGE SCANNING APPARATUS AND METHOD FOR SCANNING THEREOF

(71) Applicant: Hewlett-Packard Development Company, L.P., Spring, TX (US)

(72) Inventor: Kyoungrok Kim, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/451,327

(22) Filed: Jun. 25, 2019

(65) Prior Publication Data

US 2019/0327377 A1 Oct. 24, 2019

Related U.S. Application Data

(63) Continuation of application No. PCT/KR2017/002489, filed on Mar. 8, 2017.

(30) Foreign Application Priority Data

Dec. 29, 2016 (KR) .......................... 10-2016-0182468

(51) Int. Cl.
*H04N 1/04* (2006.01)
*H04N 1/00* (2006.01)
(52) U.S. Cl.
CPC ......... *H04N 1/042* (2013.01); *H04N 1/00018* (2013.01)
(58) Field of Classification Search
CPC ........ G03C 1/061; G03C 1/42; G03C 1/7954; G03C 1/825; G03C 1/832; G03C 2007/3043; G03C 2200/23; G03C 2200/35; G03C 5/16; G03C 5/164; G03C 5/261; G03C 5/262; G03C 5/29; G03C 5/39; G03C 7/3029; G03C 7/3041; G03C 7/407; G03C 7/42; G03C 8/4013; G06K 2207/1018; G06K 7/10732; G06K 7/10752; G06K 7/10851; H04N 1/40056; H04N 1/484
USPC ........ 358/509, 1.9, 3.27, 471, 504, 505, 518
See application file for complete search history.

(56) References Cited

U.S. PATENT DOCUMENTS

| 4,734,782 | A | * | 3/1988 | Maeshima | ........... | H04N 1/4072 |
| | | | | | | 358/3.21 |
| 5,343,235 | A | * | 8/1994 | Fukui | ................... | G03G 15/326 |
| | | | | | | 347/131 |
| 5,597,997 | A | * | 1/1997 | Obata | ................ | G06K 7/10732 |
| | | | | | | 235/455 |
| 5,633,669 | A | * | 5/1997 | Hada | .................. | H04N 1/40037 |
| | | | | | | 347/131 |

(Continued)

FOREIGN PATENT DOCUMENTS

| JP | 05-130321 A | 5/1993 |
| JP | 10-084458 A | 3/1998 |

(Continued)

*Primary Examiner* — Negussie Worku
(74) *Attorney, Agent, or Firm* — Jefferson IP Law, LLP

(57) ABSTRACT

An example image scanning apparatus includes a lighting unit to irradiate light onto a manuscript using an LED light source, a scan unit to generate a scan image by scanning image information of manuscript using light reflected by the manuscript, and a processor to control the lighting unit to irradiate light on each unit pixel by a predetermined duty during a movement process of the manuscript in a sub-scan direction.

17 Claims, 16 Drawing Sheets

(56) References Cited

U.S. PATENT DOCUMENTS

| | | | | |
|---|---|---|---|---|
| 6,239,884 B1 * | 5/2001 | Yamamoto | ......... | H04N 1/00689 355/30 |
| 6,526,185 B1 * | 2/2003 | Murakami | ........... | H04N 1/0057 358/505 |
| 6,757,084 B2 * | 6/2004 | Kurita | ................ | H04N 1/40056 358/504 |
| 6,952,294 B2 * | 10/2005 | Ishikawa | .............. | G03C 8/4013 358/505 |
| 7,205,549 B2 * | 4/2007 | Yoshida | ............. | G01N 21/8806 250/307 |
| 8,045,002 B2 * | 10/2011 | Gladnick | ........... | G01N 21/8806 348/132 |
| 8,154,718 B2 * | 4/2012 | Graf | ....................... | G01N 21/59 356/237.5 |
| 8,289,620 B2 * | 10/2012 | Bobanovic | ......... | G02B 21/0044 359/363 |
| 8,467,108 B2 * | 6/2013 | Shimatani | .............. | H04N 1/125 358/461 |
| 8,705,034 B2 * | 4/2014 | Fukazawa | .............. | G01N 21/21 356/369 |
| 8,902,414 B2 * | 12/2014 | Park | .......................... | G01J 1/00 356/121 |
| 9,234,852 B2 * | 1/2016 | Gladnick | ........... | G01N 21/8806 |
| 9,411,257 B2 * | 8/2016 | Honda | ................. | G03G 15/043 |
| 9,864,296 B2 * | 1/2018 | Fujii | .................. | G03G 15/0435 |
| 10,027,845 B2 * | 7/2018 | Okada | .................. | H04N 1/4076 |
| 2002/0067477 A1 * | 6/2002 | Morita | ................. | G01N 21/956 356/237.5 |
| 2008/0002240 A1 * | 1/2008 | Suga | .................... | H04N 1/0414 358/474 |
| 2014/0210928 A1 * | 7/2014 | Yokoi | .............. | G03G 15/04054 347/118 |

FOREIGN PATENT DOCUMENTS

| | | |
|---|---|---|
| JP | 2001-092195 A | 4/2001 |
| JP | 2002-111963 A | 4/2002 |
| JP | 2015-109604 A | 6/2015 |

* cited by examiner (a)

Y MTF Summary

| LED TURN ON | 10% | 100% |
|---|---|---|
| Pixel height | 1 Pixel | 1 Pixel |
| Resolution | 600 | 600 |
| MTF | 73.0% | 65.5% |

FIG. 14

| Duty ratio | Y MTF |
|---|---|
| 10% | 71.8% |
| 20% | 70.2% |
| 30% | 68.6% |
| 40% | 66.9% |
| 50% | 65.1% |
| 60% | 63.3% |
| 70% | 61.5% |
| 80% | 59.6% |
| 90% | 57.7% |
| 100% | 55.8% |

IMAGE SCANNING APPARATUS AND METHOD FOR SCANNING THEREOF

BACKGROUND

An image scanning apparatus is an apparatus for scanning an original image such as a document, a picture, a film, or the like, and converting the original image into digital data. The digital data may be displayed on a monitor of a computer, or printed by a printer to be generated as an output image. Representative examples of an image scanning apparatus include a scanner, a copier, a facsimile, and a multi-function peripheral (MFP) that integrally implements these functions.

The image scanning apparatus performs scanning by moving a document or by moving a scan module. As such, the scanning is performed under a condition in which, when the document or the scan module moves in a sub-scan direction, the actual scanning area for a unit pixel to be scanned is a unit pixel area at least twice as large as one pixel area in a main scan direction.

There may be a decrease in a Modulation Transfer Function (MTF) for the sensitivity characteristic in the main scan direction with respect to the sub-scan direction.

DESCRIPTION OF DRAWINGS

Various examples will be described below by referring to the following figures:

FIG. 11 and FIG. 12 are views illustrating a simulation result according to an example;

FIG. 14 is a table illustrating Modulation Transfer Function (MTF) values corresponding to duty rates of an LED light source according to an example;

DETAILED DESCRIPTION

Figure 1:
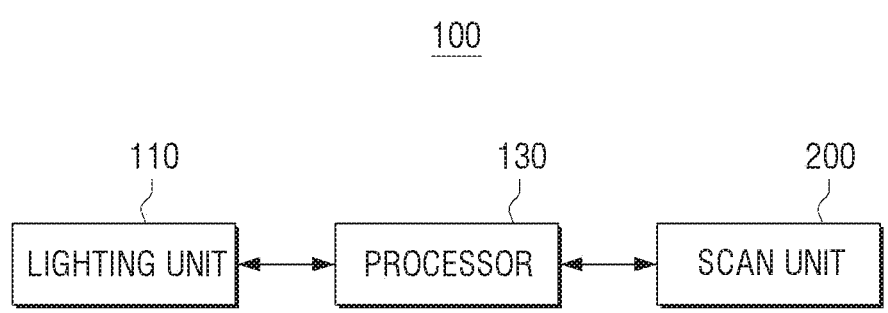
FIG. 1 is a block diagram of an image scanning apparatus according to an example.

Hereinafter, various examples will be described with reference to the accompanying drawings. The examples to be described below may be modified in various forms. In order to more clearly describe features of the examples, a description of matters which are well known to those to skilled in the art to which the examples pertain will be omitted.

In the specification, a case in which any component is "connected" with another component includes a case in which the component is directly connected to the other component and a case in which the component is connected to the other component while having yet another component interposed therebetween. In addition, a case in which any component "comprises" another component means that the component may further comprise other components, and not exclude other components, unless explicitly described to the contrary.

The expression "image forming job" as used herein may refer to any of various jobs related with an image, such as, formation of an image or generation/storage/transmission of image files (e.g., copying, printing, scanning, or faxing), and the expression "job" as used herein may refer to not only the image forming job, but also a series of processes required for performance of the image forming job.

In addition, an "image scanning apparatus" refers to an apparatus for scanning a manuscript (e.g., paper) and generating a scan image. Examples of the image scanning apparatus may include a scanner, a copier, a facsimile, a multi-function peripheral (MFP) that complexly implements functions thereof through a single apparatus, and the like. The image scanning apparatus may be referred to as an image forming apparatus when it is a printer, a scanner, a copier, a facsimile, or an MFP that can perform an image forming job.

In addition, an "image forming apparatus" refers to a device for printing print data generated from a terminal such as a computer on a recoding medium such as paper. Examples of the image forming apparatus may include a copier, a printer, a facsimile, a scanner, an MFP that complexly implements functions thereof through a single device, and the like. The image forming apparatus may refer to any device capable of performing an image forming task, such as the copier, the printer, the scanner, the facsimile, the MFP, a display device, or the like.

The expression "hard copy" as used herein may refer to an operation of outputting an image on a print medium such as paper, or the like, and the expression "soft copy" may refer to an operation of outputting an image on a display device such as a TV, a monitor, or the like or outputting an image to a memory.

The expression "content" as used herein may refer to any type of data as a subject of an image forming job, such as a picture, an image, a document, or the like.

The expression "printing data" as used herein may refer to data converted into a format that can be printed by a printer. When the printer supports direct printing, the file itself may be the printing data.

The expression "scan data" as used herein may refer to a scan image generated by a scan unit. The generated scan image may be a black and white image or a color image, and may have various forms of file formats (e.g., BMP, JPG, TIFF, PDF, etc.).

The expression "main scan direction" as used herein may refer to a scan direction of a scan unit. In an example, the main scan direction may be a direction perpendicular to a movement direction of printing paper.

The expression "sub-scan direction" as used herein may refer to a movement direction of printing paper.

The expression "user" as used herein may refer to a person who performs a manipulation related with an image forming job using an image forming apparatus or a device connected to the image forming apparatus in a wired or wireless manner. Further, the expression "manager" as used herein may refer to a person who has an authority to access all the functions and systems of the image forming apparatus. The "manager" and the "user" may refer to the same person.

FIG. 1 is a block diagram of an image scanning apparatus according to an example.

Referring to FIG. 1, an image scanning apparatus 100 may include a lighting unit 110, a processor 130, and a scan unit 200.

The lighting unit 110 may irradiate light onto a manuscript (e.g., a paper, an image, a picture, a document, or the like) using a light emitting diode (LED) light source. A brightness value of the LED light source may be adjusted. The LED light source may output light having a brightness value corresponding to a magnitude of an input current. Light from the lighting unit 110 may be output continuously or discontinuously depending on whether the current of the LED light source is input. The lighting unit 110 may receive a control signal for brightness value information and operation duty information. The LED light source may be a white (W) LED light source or a module with a red (R) LED, a green (G) LED, and a blue (B) LED combined.

The lighting unit 110 may include additional components such as a polarizer plate so as to irradiate light onto the manuscript uniformly.

The scan unit 200 may generate a scan image by scanning image information of a manuscript using light reflected by the manuscript. An example configuration and operation of a scan unit will be described with reference to FIG. 3. Examples of the scan unit 200 include a flatbed form and/or an automatic document feeder (ADF) form.

The processor 130 may control each constituent element of the image scanning apparatus 100. The processor 130 may be embodied with a central processing unit (CPU), an application specific integrated circuit (ASIC), a system on chip (SoC), or the like and detect whether a scan command is received from a user. The scan command may be input through an operation input unit provided in the image scanning apparatus 100, or input through a communicator as a signal from an external device.

When a scan command is input, the processor 130 may control the lighting unit 110 and the scan unit 200 to perform a scan job.

The processor 130 may control the lighting unit 110 to irradiate light at a predetermined duty at every unit pixel (or a predetermined time, or a predetermined distance, for example, 42 um) during the movement of a manuscript in a sub-scan direction. For example, the processor 130 may control the lighting unit 110 to irradiate light continuously on every unit pixel at a predetermined time point, and not to irradiate light after a time corresponding to a predetermined duty. The predetermined time point may be a point at which a shift (SH) signal value of the CCD transitions. The predetermined duty may be 5 to 50%. The processor 130 may generate a control signal with respect to the LED light source according to the operation speed of a driver and the predetermined duty and provide the control signal to the lighting unit 110.

The processor 130 may control the lighting unit 110 to irradiate light of a brightness value that is inversely proportional to a predetermined duty. For this operation, the processor 130 may generate a control signal including current value information corresponding to the brightness value of an LED light source and provide the control signal to the lighting unit 110.

For this operation, the processor 130 may generate a control signal for the LED light source according to the operation speed of the driver and the predetermined duty and provide the control signal to the lighting unit 110.

The processor 130 may control the scan unit 200 to scan a plurality of image information in a main scan direction on a pixel basis during the movement of a manuscript in a sub-scan direction.

When a scan image is generated by the scan unit 200, the processor 130 may control constituent elements of the image scanning apparatus 100 to store the scanned image in a storage, transmit the scanned image to the external device through a communicator, or print the scanned image in an image forming unit.

The image scanning apparatus 100 may turn on a light source for a short period of time on a line basis and turn off the light source for the remaining time, and thus an actual image acquisition width may be reduced. Accordingly, the image scanning apparatus 100 may improve the sensitivity and Modulation Transfer Function (MTF) in a sub-scan direction.

An example configuration of an image scanning apparatus has been illustrated and described. However, in other examples, various configurations may be further added. Examples of such other configurations will be described with reference to FIG. 2.

Figure 2:
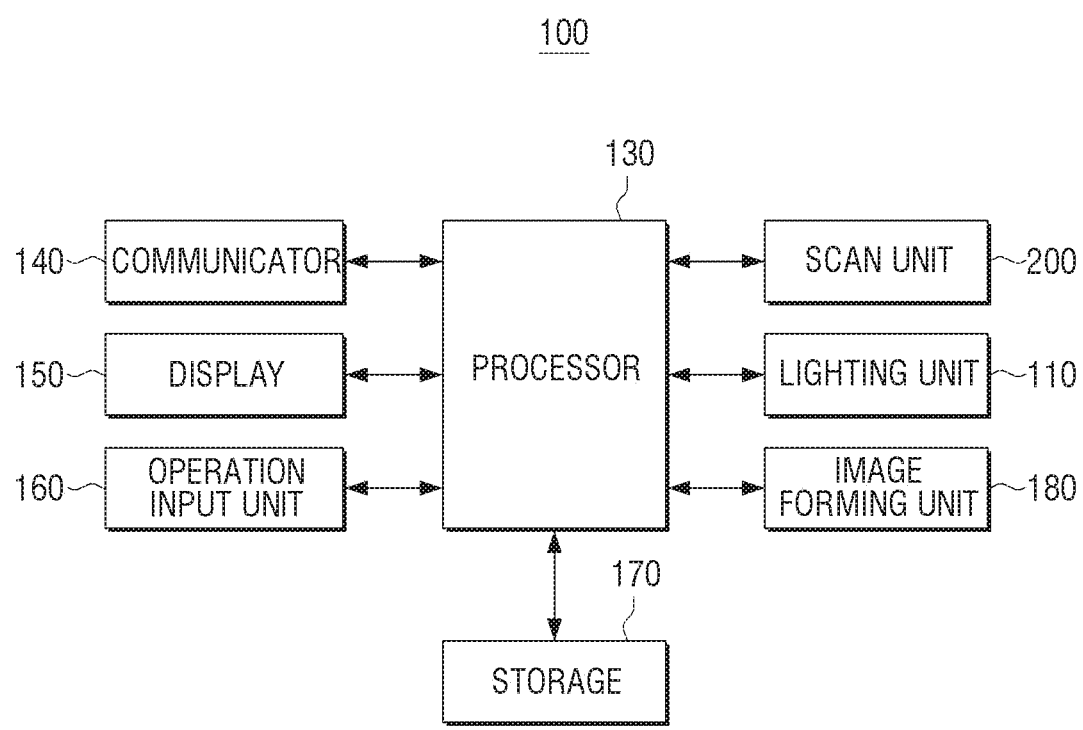
FIG. 2 is a block diagram of an image scanning apparatus according to an example.

FIG. 2 is a block diagram of an image scanning apparatus according to an example.

Referring to FIG. 2, an image scanning apparatus 100 may include a lighting unit 110, a processor 130, a communicator 140, a display 150, an operation input unit 160, a storage 170, an image forming unit 180, and a scan unit 200.

The operations of the lighting unit 110, the processor 130, and the scan unit 200 have been described with reference to FIG. 1, and thus a redundant description will be omitted.

The communicator 140 may be connected to an external device (e.g., a terminal device (not shown)) such as a mobile device (e.g., a smart phone, a tablet personal computer (PC)), a PC, a laptop, a personal digital assistant (PDA), a digital camera, etc. and may receive files and print data from the terminal device (not shown). The communicator 140 may connect the image scanning apparatus 100 to the external device, and be connected to the external device through a Local Area Network (LAN), the Internet, or the like, as well as a Universal Serial Bus (USB) port, a wireless communication (e.g., WiFi 802.11a/b/g/n, NFC, Bluetooth, etc.) port, or the like.

The communicator 140 may transmit a scan image generated by the scan unit 200 or a scan image pre-stored in the storage 170 to the external device.

The display 150 may display various information provided by the image scanning apparatus 100. The display 150 may display a user interface window for selecting various functions provided by the image scanning apparatus 100.

The display 150 may be a monitor such as a liquid crystal display (LCD), a cathode ray tube (CRT), a light emitting diode (LED), an organic LED (OLED), etc., or embodied as a touch screen that may simultaneously perform a function of the operation input unit 160.

The display 150 may display a control menu for performing a function of the image scanning apparatus 100. The user may input a scan command on the displayed user interface window. The scan command may be a command for performing only a scan job, and the command may include a command of scan-to-server, scan-to-digital living network alliance (DLNA), scan-to-cloud, etc. for transmitting the scanned image to a server.

When the image scanning apparatus 100 is an MFP capable of both printing and copying, the scan command may be a copy command for using a scan function. As an example, a scan command may be received through the operation input unit 160. In another example, the scan command may be received from an external device (not shown) through the communicator 140.

The display 150 may display a generated scan image and information on the scan image. The displayed scan image may be a scan image itself, or a preview image for the scan image.

The operation input unit 160 may receive a function selection and a control command for a selected function from a user. The function may include printing, copying, scanning, facsimile transmission, etc. The operation input unit 160 may receive the function selection and the control command through a control menu displayed on the display 150.

The operation input unit 160 may be embodied as a plurality of buttons, a keyboard, a mouse, or the like or embodied as a touch screen capable of performing the function of the display 150.

The storage 170 may store print data received through the communicator 140. The storage 170 may store a scan image generated by the scan unit 200.

The storage 170 may store information on a predetermined duty, information on a plurality of duties, a brightness value (or a current value) corresponding to each of the plurality of duties in the form of a look-up table, or the like.

The storage 170 may be embodied as a storage medium in the image scanning apparatus 100 or an external storage medium, for example, a removable disk including a USB memory, a storage medium connected to a host device, a web server through network, etc. The storage 170 may be a volatile memory such as a dynamic random access memory (DRAM), a synchronous RAM (SRAM), or the like, or a non-volatile memory such as a hard disk drive (HDD), a solid state drive (SSD), a flash memory, or the like, or may be a combination of the volatile memory and the non-volatile memory.

The image forming unit 180 may print printing data. The image forming unit 180 may form an image on a recording medium by various printing methods such as an electro-photographic method, an inkjet method, a thermal transfer method, a direct thermal method, or the like. For example, the image forming unit 180 may print an image on a recording medium by a series of processes including exposure, development, transfer, and fixing.

FIG. 1 and FIG. 2 illustrate that the lighting unit 110 performs light irradiation under the control of the processor 130. However, this is only an example and in other examples, the lighting unit 110 may perform a fixing function under the control of the scan unit 200. In an example, the lighting unit 110 may be embodied as the configuration in the scan unit 200.

In addition, FIG. 1 and FIG. 2 illustrate and describe a general function of the image scanning apparatus 100. However, this is only an example and the image scanning apparatus 100 may further include a scan unit for performing scanning, a facsimile transceiver for transmitting and receiving a facsimile, etc.

Figure 3:
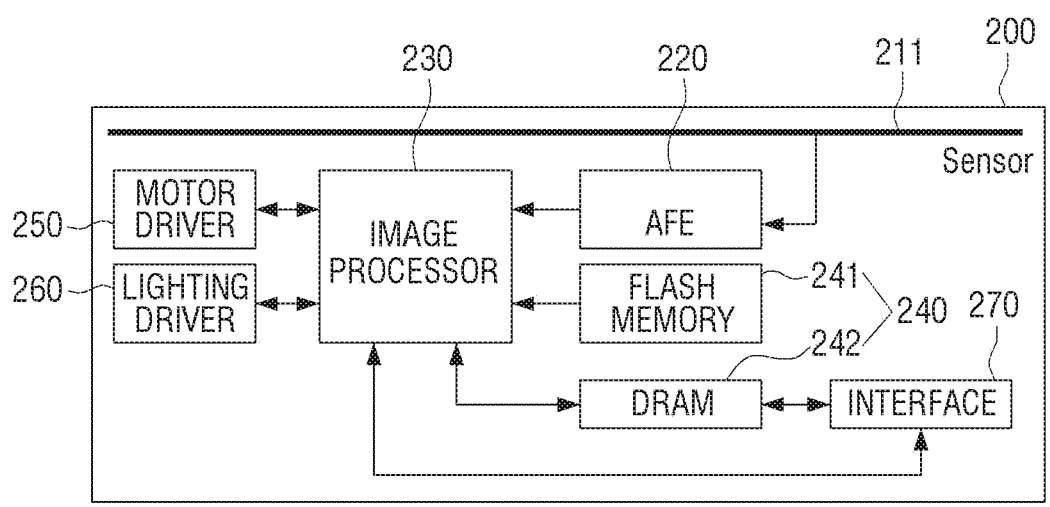
FIG. 3 is a view illustrating a scan unit according to an example.

FIG. 3 is a view illustrating a scan unit according to an example. In the example illustrated in FIG. 3, the scan unit may be embodied as a separate scan device.

Referring to FIG. 3, a scan unit 200 may include a sensor circuit 211, a conversion circuit 220, an image processor 230, a memory circuit 240, a motor driver 250, a lighting driver 260, and a communication circuit (i.e., an interface) 270.

The sensor circuit 211 may scan image information of a manuscript. The sensor circuit 211 may include a plurality of Charge Coupled Devices (CCD) or a plurality of CMOS image sensors (CISs) arranged in a row in a main scan direction.

The conversion circuit 220 may convert a signal scanned by the sensor circuit 211 into a digital signal. As an example, in the case of a CCD or a Digital CIS, the scanned signal may be converted into the digital signal to be output. However, in the case of a CMOS image sensor (CIS), the scanned signal may be output as an analog signal. Therefore, when the sensor circuit 211 includes the CIS, the scanned signal may be converted into the digital signal using the conversion circuit 220, and the digital signal may be transmitted to the image processor 230. In an example, the conversion circuit 220 may be implemented as an analog front end (AFE).

The image processor 230 may perform image processing for the scanned signal. The image processor 230 may generate a scan image using the signal received through the sensor circuit 211 or the conversion circuit 220.

The image processor 230 may control each constituent element of the scan unit 200. The image processor 230 may control the sensor circuit 211 to perform a scanning operation when a scan command is input.

The image processor 230 may control a driver (not shown). The image processor 230 may control power supplied to a motor for moving a manuscript or the scan unit 200 using the motor driver 250 to control the operation speed, location, etc. of the manuscript or the sensor circuit 211.

The image processor 230 may control the lighting unit 110. The image processor 230 may control an amount of light irradiated on a manuscript by controlling the magnitude and the application time of power supplied to the lighting unit 110 using the lighting driver 260.

The image processor 230 may control the lighting unit 110 to irradiate light on each unit pixel at a predetermined duty during the movement of the manuscript in a sub-scan direction. For example, the image processor 230 may control the lighting unit 110 to continuously irradiate light on each unit pixel at a predetermined time point and not to irradiate light after a time corresponding to the predetermined duty. The predetermined time may be a time point at which the SH signal value of the CCD transitions. The predetermined duty may be 5 to 50%.

The image processor 230 may control the lighting unit 110 to irradiate light of a brightness value inversely proportional to the predetermined duty.

The memory circuit 240 may store data for image processing. The memory circuit 240 may include a flash memory 241 for storing programs required for performing the image processing of the image processor 230 and a RAM 242 for storing the signal scanned by the image sensor circuit 211 and the data processed by the image processor 230.

The motor driver 250 may control power supplied to a driver (not shown) for moving a manuscript or the scan unit 200. The motor driver 250 may control power supplied to the driver under the control of the image processor 230 and control the movement speed and location of the manuscript or the image sensor circuit 211.

The lighting driver 260 may control power supplied to the lighting unit 110. The lighting driver 260 may control the light irradiation interval and the brightness value of the light source of the lighting unit 110 under the control of the image processor 230.

The communication circuit 270 may output the data processed by the image processor 230 using the digital method. The communication circuit 270 may be a connector to connect the image processor 230 to an external controller or an external device, for example, a USB connector.

Figure 4:
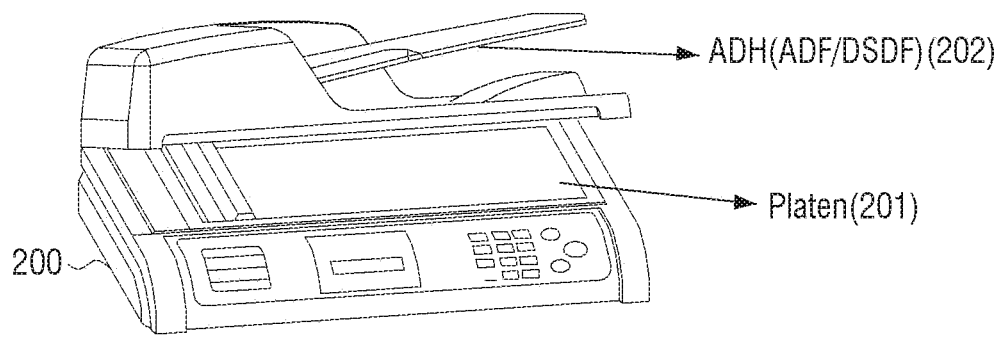
FIG. 4 is a view illustrating a form of a scan unit according to an example.

FIG. 4 is a view illustrating a form of a scan unit according to an example.

Referring to FIG. 4, the scan unit 200 may include a first scan unit 201 in a flatbed form for scanning a manuscript on a board (e.g., a platen), and a second scan unit 202 in a form for automatic feeding for continuously scanning manuscripts on an automatic feeder (e.g., an automatic document handler (ADH), an ADF, a dual sided document feeder (dsdf), etc.).

In the illustrated example, the scan unit 200 includes two scan configurations. However, in other examples, the scan unit 200 may consist of any one of the scan configurations, or even three scan configurations.

The first scan unit 201 may be a scan device in the flatbed form, a manuscript may be provided on the board, and a scan module under the board may move and scan the manuscript. An example configuration and operation of the first scan unit 201 will be described with reference to FIG. 5.

The second scan unit 202 may be a scan device in the form for automatic feeding. One or more manuscripts may be placed on the automatic feeder, sequentially moved to a movement path, and the scan module disposed on the movement path may scan the one or more manuscripts. An example configuration and operation of the second scan unit 202 will be described with reference to FIG. 6. The second scan unit 202 may be a single-sided scan device for scanning a single side of the manuscript, or a double-sided scan device capable of scanning both sides of the manuscript.

As described above, the first scan unit 201 and the second scan unit 202 may have a separate scan module. However, in other examples, a single scan module may be commonly used in the first scan unit 201 and the second scan unit 202.

Figure 5:
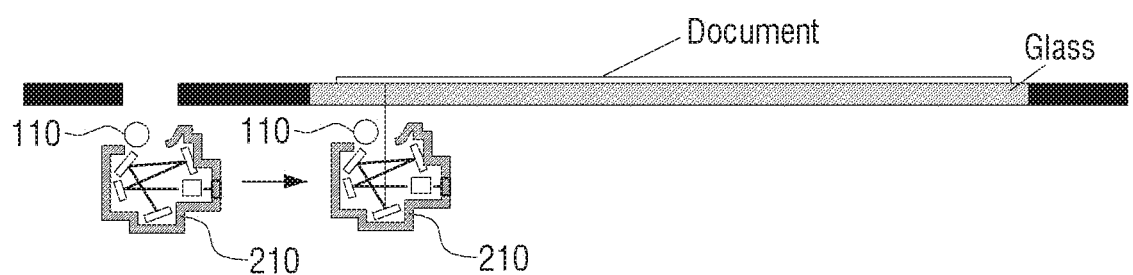
FIG. 5 is a view to explain operations of a scan unit and a location sensor in a flatbed form according to an example.

FIG. 5 is a view to explain operations of a scan unit and a location sensor in a flatbed form according to an example.

Referring to FIG. 5, the scan module 210 of the first scan unit 201 may be disposed under the flatbed, and move from a groove area to a manuscript area according to a scan command. The lighting unit 110 may be disposed on the scan module 210 to irradiate light upwardly.

When the scan module 210 moves to the manuscript area, the lighting unit 110 may continuously irradiate light on each unit pixel at a predetermined time point and may not irradiate light after a time corresponding to a predetermined duty. Such process may be performed repeatedly to the end of the manuscript.

Figure 6:
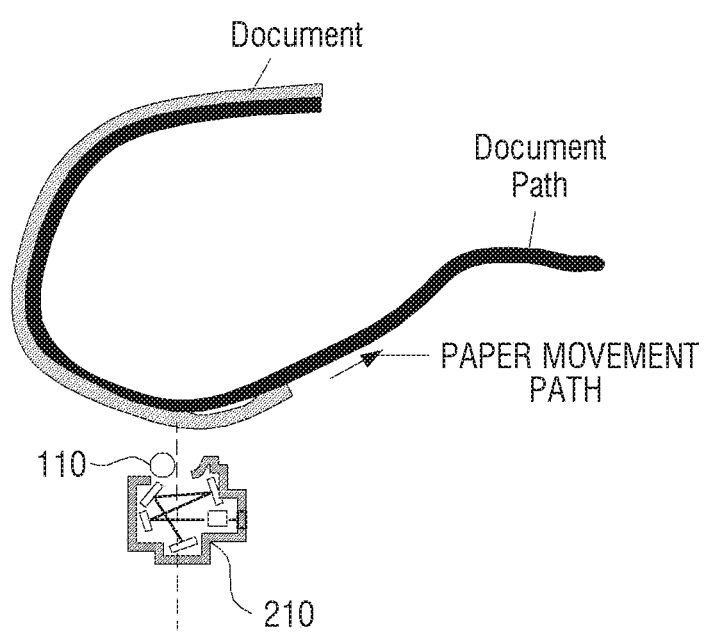
FIG. 6 is a view to explain operations of a scan unit and a location sensor in an automatic feeding form according to an example.

FIG. 6 is a view to explain operations of a scan unit and a location sensor in an automatic feeding form according to an example.

Referring to FIG. 6, a scan module 210 of a second scan unit 202 may be disposed in a predetermined area on a movement path, and the lighting unit 110 may be disposed on the scan module 210 to irradiate upwardly.

When a manuscript is moved on the movement path, the lighting unit 110 may continuously irradiate light on each unit pixel at a predetermined time point, and may not irradiate light after a time corresponding to a predetermined duty. Such process may be performed repeatedly until a manuscript passes through the movement path.

Figure 7:
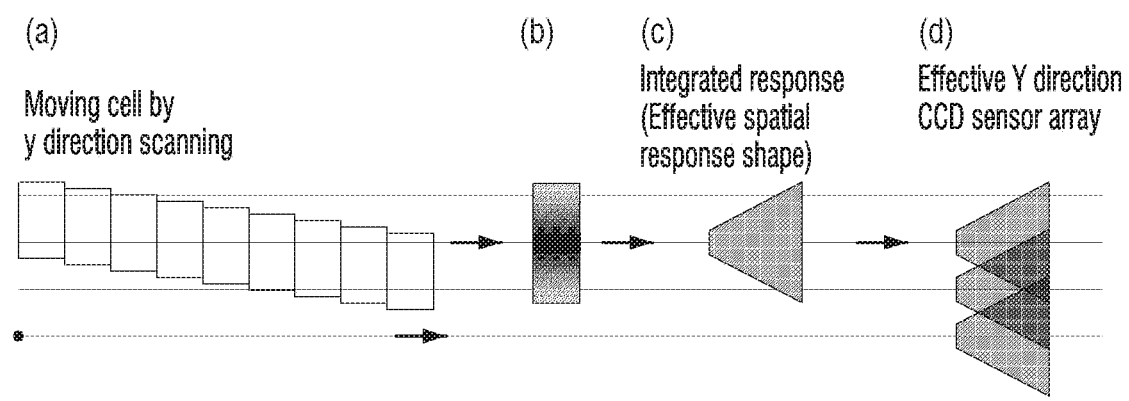
FIG. 7 is a view illustrating a scanning sensitivity pattern in a sub-scan direction according to an example.

FIG. 7 is a view illustrating a scanning sensitivity pattern in a sub-scan direction according to an example.

Referring to FIG. 7, the scanning sensitivity in a sub-scan direction may have a triangle or trapezoidal shape, unlike that in a main scan direction.

As an example, referring to frame (a) of FIG. 7, an image sensor for continuously scanning an image while scanning an image in a unit pixel length may move in a sub-scan direction.

Therefore, an area in which the image sensor scans an image for a unit time, referring to frame (b) of FIG. 7, may have a unit pixel length in a main scan direction, but have a length greater than the unit pixel length (approximately twice the unit pixel length) in a sub-scan direction.

Frame (c) of FIG. 7 is a view illustrating a scanning sensitivity shape of one area, and frame (d) of FIG. 7 is a view illustrating a scanning sensitivity shape of a plurality of unit pixels in a sub-scan direction.

Figure 8:
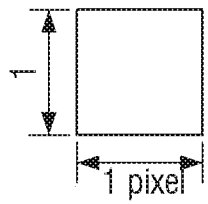
FIG. 8 is a view illustrating a scanning sensitivity in a main scan/sub-scan direction according to a pixel size of an image sensor according to an example.

FIG. 8 is a view illustrating a scanning sensitivity in a main scan/sub-scan direction according to a pixel size of an image sensor according to an example.

An image sensor with a longer length than a unit pixel in a sub-scan direction (e.g., 1.6 times the unit pixel length) may be used for improving sensitivity. In this case, referring to FIG. 8, the sensitivity width with respect to a sub-scan direction may be 2.6 times as long as the unit pixel length.

However, referring to FIG. 8, the sensitivity width with respect to the sub-scan direction may be twice or 2.6 times the unit pixel length, and thus the MTF in a sub-scan direction may be significantly lower than the MTF in a main scan direction.

In this regard, according to an example, the sensitivity in a sub-scan direction may be improved by controlling the exposure time of the amount of light irradiated on a manuscript in order to reduce the degradation of the MTF in a sub-scan direction.

Regarding a method for controlling the exposure time of the amount of light, a conventional light source control method and a light source control method according to an example will be compared below.

Figure 9:
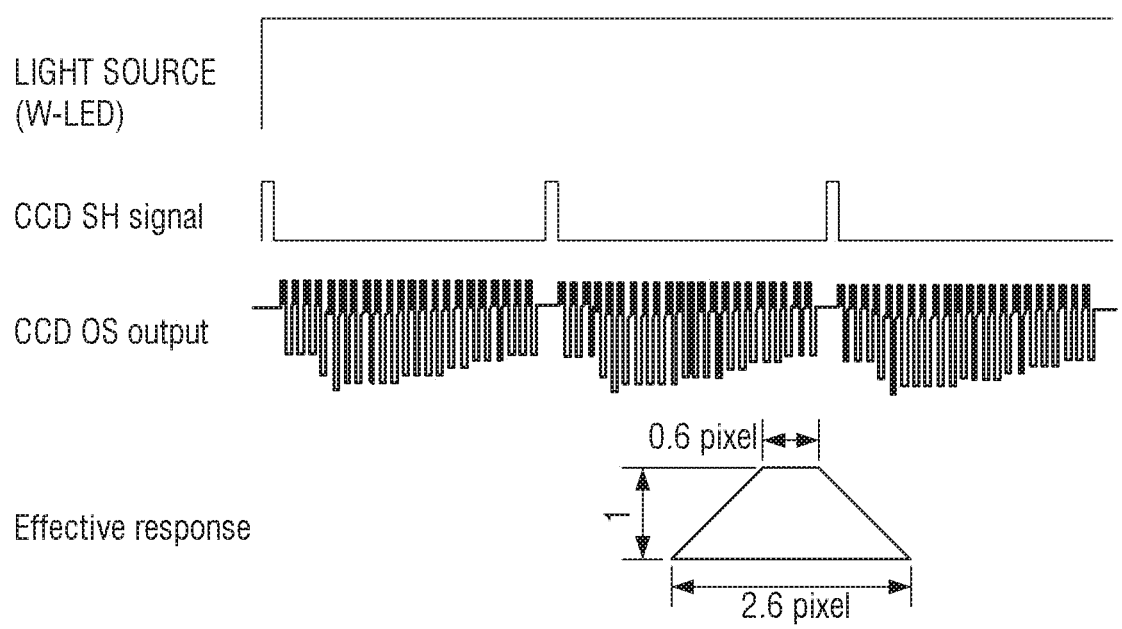
FIG. 9 is a view to explain a conventional light source controlling method.
Figure 10:
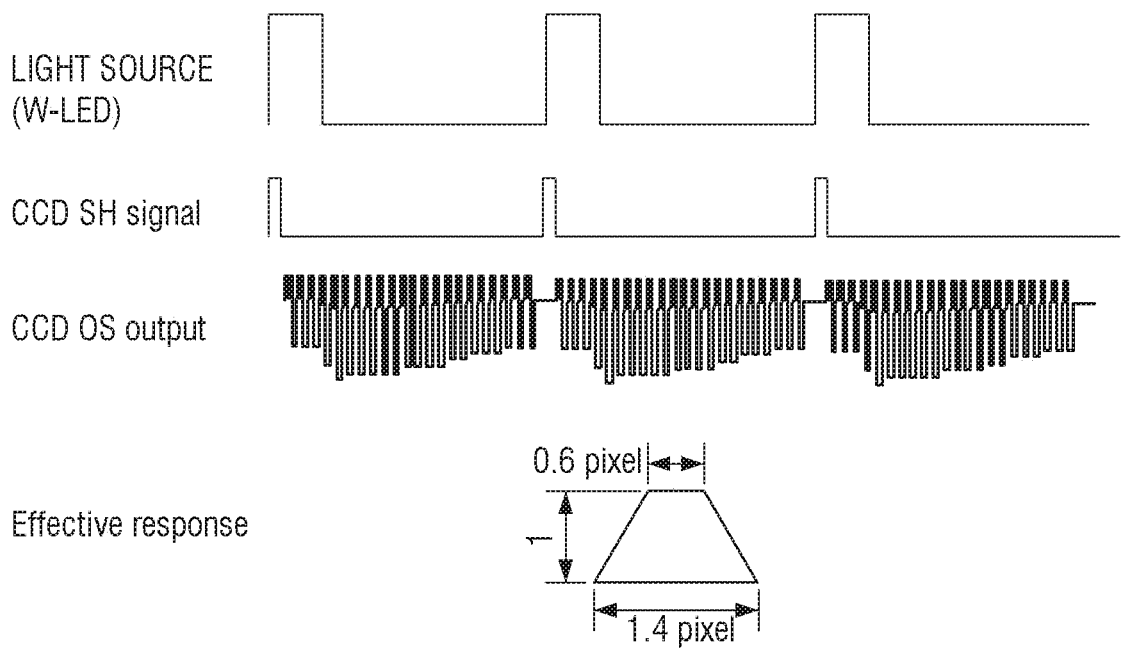
FIG. 10 is a view to explain a light source controlling method according to an example.

FIG. 9 is a view to explain a conventional light source controlling method, and FIG. 10 is a view to explain a light source controlling method according to an example.

Referring to FIG. 9, conventionally, a scan module may obtain an image in a main scan direction on a line basis while an illumination light source is continuously turned on.

However, according to an example, the illumination light source may be turned on for a very short period of time, and turned off for the remaining time. Therefore, practically, the image acquisition width of the scan module may be reduced in a sub-scan direction.

In more detail, when a time required for moving an image sensor or manuscript in a sub-scan direction by one pixel distance is referred to as a line exposure time, if a light source may be turned on for 10% of the line exposure time, and turned off for 90% of the line exposure time, the sensitivity width may be increased from 2 pixel to 1.1 pixel. It is preferable that the time for turning on the light source is not disconnected but continuous. For example, when the light source is turned on for 2% of the line exposure time for five times for turning on the light source for 10% of the light exposure time in total, the area sensed when the light source is turned on may be two pixel distance as the prior art.

Because the time for turning on the light source during the line exposure time is reduced, the amount of light irradiated on a manuscript may also be reduced. Therefore, the scan unit 200 may increase the brightness value of the LED light source to correspond to a ratio (or duty) of time for turning on the light source to maintain the entire amount of light irradiated on the manuscript in order to equalize the amount of light irradiated on the manuscript.

Referring to FIG. 10, a light source may be turned on continuously for 40% of the line exposure time, and the remaining 60% of the line exposure time may be turned off. Accordingly, it can be seen that the sensitivity width may be 1.4 pixel as compared to 2.6 pixel in FIG. 9, such that the sensitivity function is increased.

Figure 11:
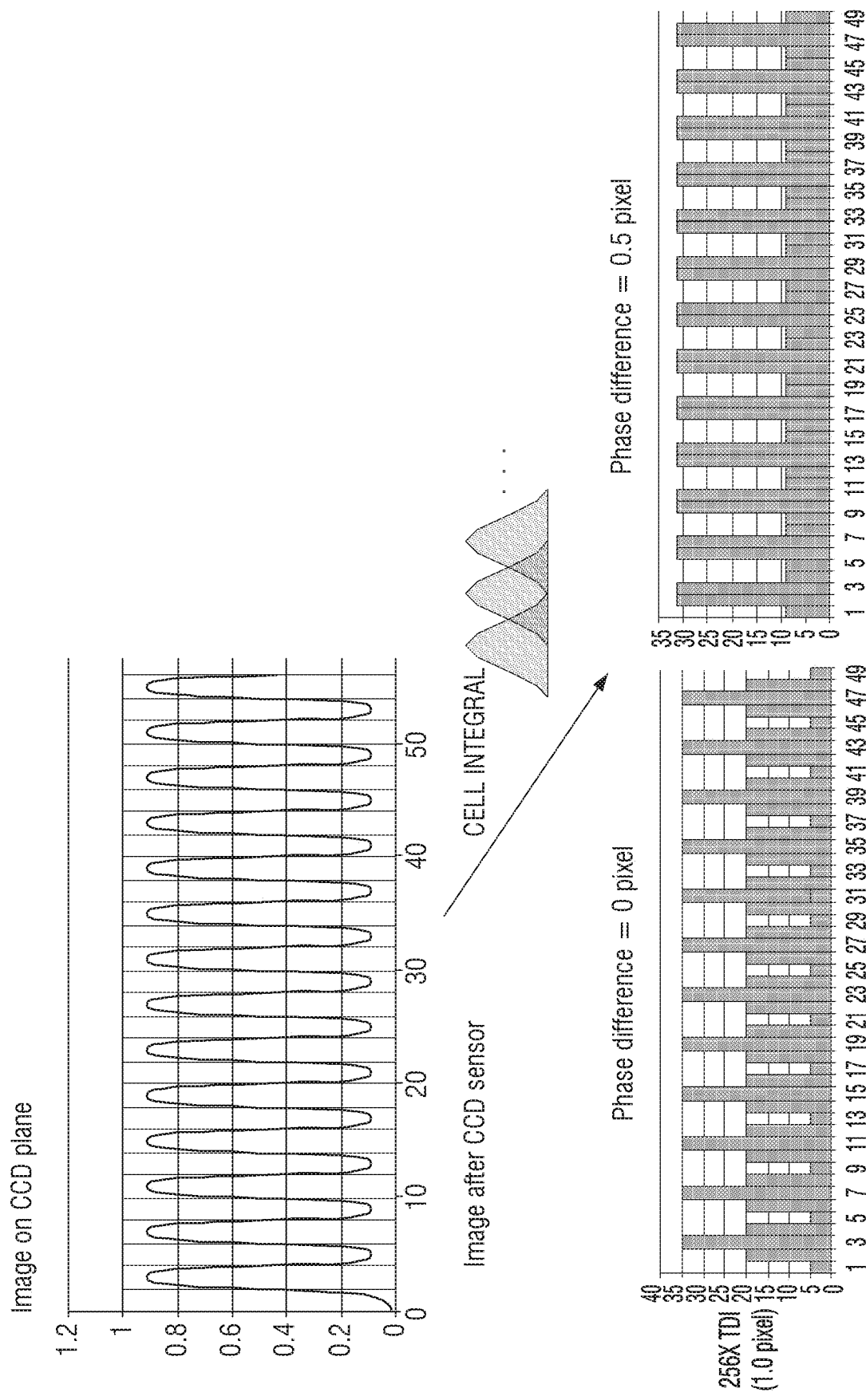

FIG. 11 and FIG. 12 are views illustrating a simulation result according to an example. In more detail, FIG. 11 is a view illustrating a process of calculating MTFs, and FIG. 12 is a view illustrating a calculation result thereof.

Referring to FIG. 12, when a duty of the time for turning on the light source is adjusted from 100% to 10%, the MTF performance may be improved from 65.5% to 73%. Therefore, a scan image generated according to an example may have improved image quality in a sub-scan image.

Figure 13:
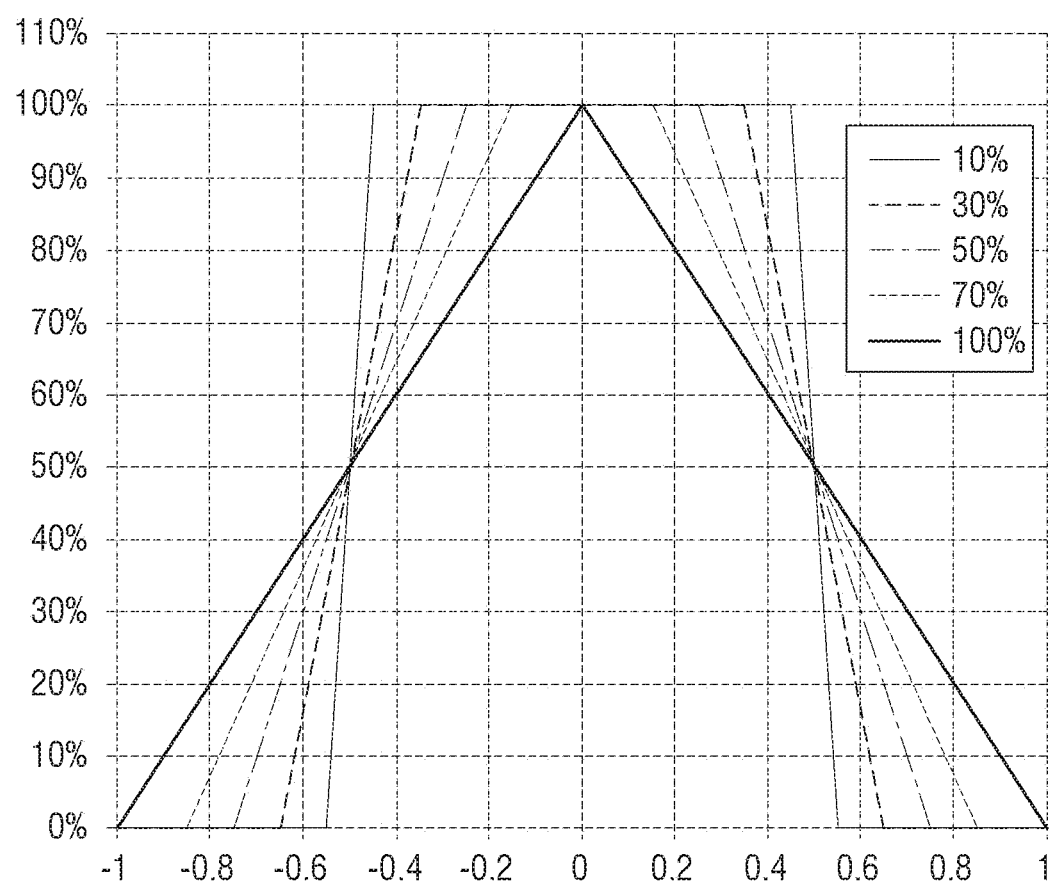
FIG. 13 is a view illustrating a scanning sensitivity according to a duty rate of a light emitting diode (LED) light source according to an example.

FIG. 13 is a view illustrating a scanning sensitivity according to a duty rate of an LED light source according to an example.

Referring to FIG. 13, when a duty rate of the LED light source is 100%, the scanning sensitivity in the sub-scan direction may have a triangle shape unlike that in the main scan direction.

However, when the duty rate is reduced, the scanning sensitivity in the sub-scan direction may be increased to have a trapezoidal shape.

Figure 15:
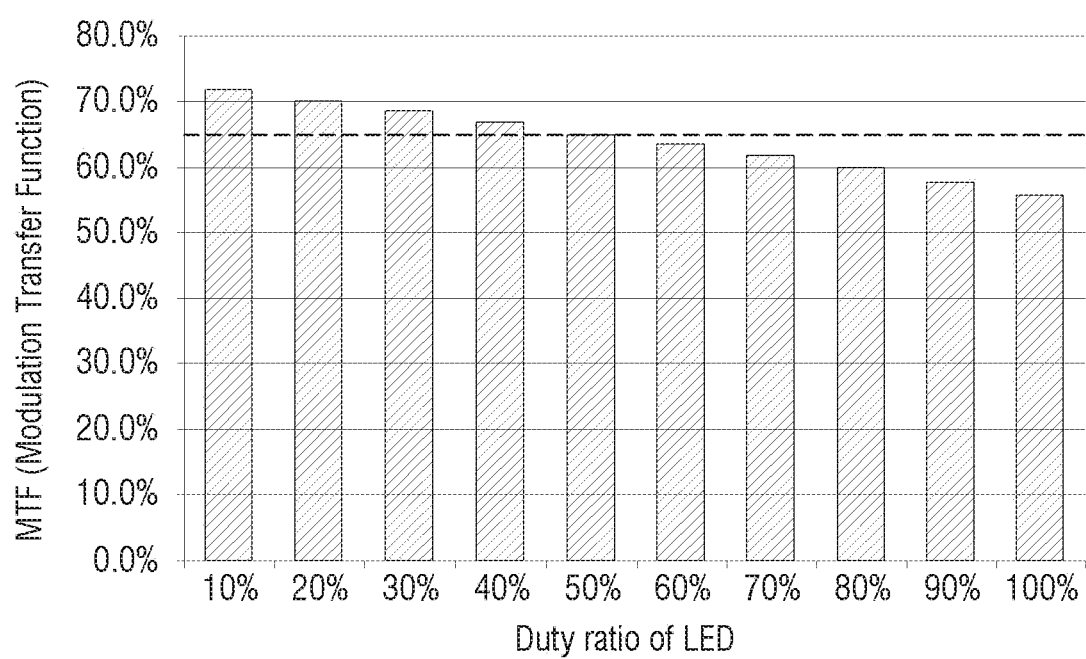
FIG. 15 is a view illustrating MTF values corresponding to duty rates of an LED light source according to an example.

FIG. 14 is a table to show MTF values corresponding to duty rates of an LED light source according to an example, and FIG. 15 is a view illustrating MTF values corresponding to duty rates of the LED light source according to an example. FIG. 14 is a table illustrating MTF values corresponding to duty rates in a different system from that of FIG. 12.

Referring to FIG. 14 and FIG. 15, the MFT performance may be gradually increased as the duty of the time for turning on the light source is reduced. As an example, when the duty is equal to or less than 40%, the MTF performance may be 65% or more to have the improved image quality with respect to the sub-scan direction.

Figure 16:
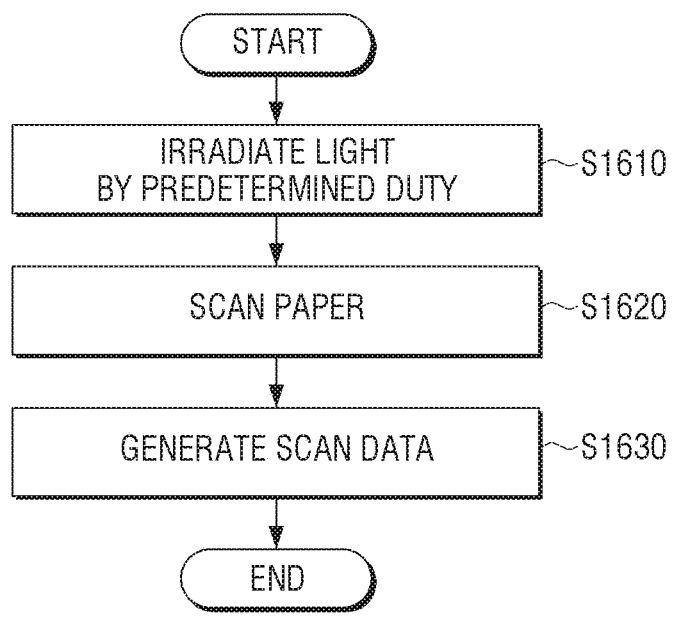
FIG. 16 is a flowchart of a method for image scanning according to an example.

FIG. 16 is a flowchart of a method for image scanning according to an example.

Referring to FIG. 16, light may be irradiated on each unit pixel at a predetermined duty during the movement of a manuscript in the sub-scan direction using an LED light source at operation S1610. As an example, light may be irradiated continuously on each unit pixel at a predetermined time point and light may not be irradiated after a time corresponding to a predetermined duty. The light of a brightness value inversely proportional to the predetermined duty may be irradiated.

Image information of a manuscript may be scanned using the light reflected by the manuscript on a unit pixel at operation S1620.

The above-described irradiating and scanning process may be performed in all areas of the manuscript, and a scan image may be generated by combining image information on all areas at operation S1630.

When a scan image is generated, the generated scan image may be transmitted to a host device, or a printing job may be performed for the scan image.

Therefore, according to an image scanning method as disclosed in an example, a light source may be turned on line by line for a short period of time, and turned off for the remaining time to reduce the actual image acquisition width. Accordingly, the image scanning method may improve the sensitivity in the sub-scan direction and the MTF performance. The example image scanning method illustrated in FIG. 16, may be performed by an image scanning apparatus having a configuration of FIG. 1 or FIG. 2, or a scan device having a configuration of FIG. 3. Also, the image scanning method may be performed on an image forming apparatus or a scan device having another configuration.

Furthermore, the image scanning method as described above may be implemented as at least one execution program for executing the image scanning method as described above, and the execution program may be stored in a non-transitory computer readable recording medium.

Thus, each block of the disclosure may be embodied as computer-writable code on a non-transitory computer-readable recording medium. The non-transitory computer-readable recording medium may be a device capable of storing data that can be read by a computer system.

Although examples have been shown and described, it will be appreciated by those skilled in the art that changes may be made to these examples without departing from the principles and spirit of the disclosure. Accordingly, the scope of the disclosure is not construed as being limited to the described examples, but is defined by the appended claims as well as equivalents thereto.

What is claimed is:

1. An image scanning apparatus, comprising:
a lighting unit to irradiate a light onto a manuscript using a light emitting diode (LED) light source;
a scan unit to generate a scan image by scanning image information of a manuscript using light reflected by the manuscript; and
a processor to control the lighting unit to irradiate the light onto the manuscript for a predetermined duty of a line exposure time during a movement process of the manuscript in a sub-scan direction,
wherein no light is irradiated onto the manuscript for a remainder of the line exposure time after the predetermined duty of the line exposure time.

2. The apparatus as claimed in claim 1, wherein the processor is to control the lighting unit to irradiate the light continuously onto the manuscript beginning at a predetermined time point of the line exposure time.

3. The apparatus as claimed in claim 2,
wherein the scan unit includes an image sensor having a charge coupled device (CCD), and
wherein the predetermined time point of the line exposure time comprises a transition time of a shift signal value of the CCD.

4. The apparatus as claimed in claim 1, wherein the processor is to control the lighting unit to irradiate the light of a brightness value inversely proportional to the predetermined duty.

5. The apparatus as claimed in claim 1, wherein the predetermined duty is between 5% and 50% of the line exposure time.

6. The apparatus as claimed in claim 1, further comprising:
a driver to move the manuscript or the scan unit.

7. The apparatus as claimed in claim 6, wherein the processor is to generate a control signal with respect to the LED light source according to an operation speed of the driver and the predetermined duty and provide the control signal to the lighting unit.

8. The apparatus as claimed in claim 1, further comprising:
   an image forming unit to print the generated scan image.

9. The apparatus as claimed in claim 8, wherein the image scanning apparatus is one of a copier, a facsimile, or a multifunction peripheral (MFP).

10. The apparatus as claimed in claim 1, wherein the scan unit includes an image sensor in which a plurality of charge coupled devices (CCDs) are disposed in a row in a main scan direction of the manuscript.

11. A method for image scanning, the method comprising:
   irradiating light onto a manuscript for a predetermined duty of a line exposure time during a movement process of the manuscript in a sub-scan direction using a light emitting diode (LED) light source;
   scanning image information of the manuscript using light reflected by the manuscript; and
   generating a scan image,
   wherein no light is irradiated onto the manuscript for a remainder of the line exposure time after the predetermined duty of the line exposure time.

12. The method as claimed in claim 11, wherein the irradiating of the light comprises continuously irradiating the light onto the manuscript beginning at a predetermined time point of the line exposure time.

13. The method as claimed in claim 11, wherein the irradiating comprises irradiating the light of a brightness value inversely proportional to the predetermined duty.

14. The method as claimed in claim 11, wherein the predetermined duty is between 5% and 50% of the line exposure time.

15. The method as claimed in claim 11, further comprising:
   generating a control signal for the LED light source according to a movement speed of the manuscript or a scan unit and the predetermined duty.

16. The method as claimed in claim 11, wherein the generating of the scan image comprises using an image sensor in which a plurality of charge coupled devices (CCDs) are disposed in a row in a main scan direction of the manuscript.

17. The apparatus as claimed in claim 1,
   wherein the LED light source comprises a combination of a red LED, a green LED, and a blue LED, or
   wherein the LED light source comprises a white LED.

* * * * *